UNITED STATES PATENT OFFICE.

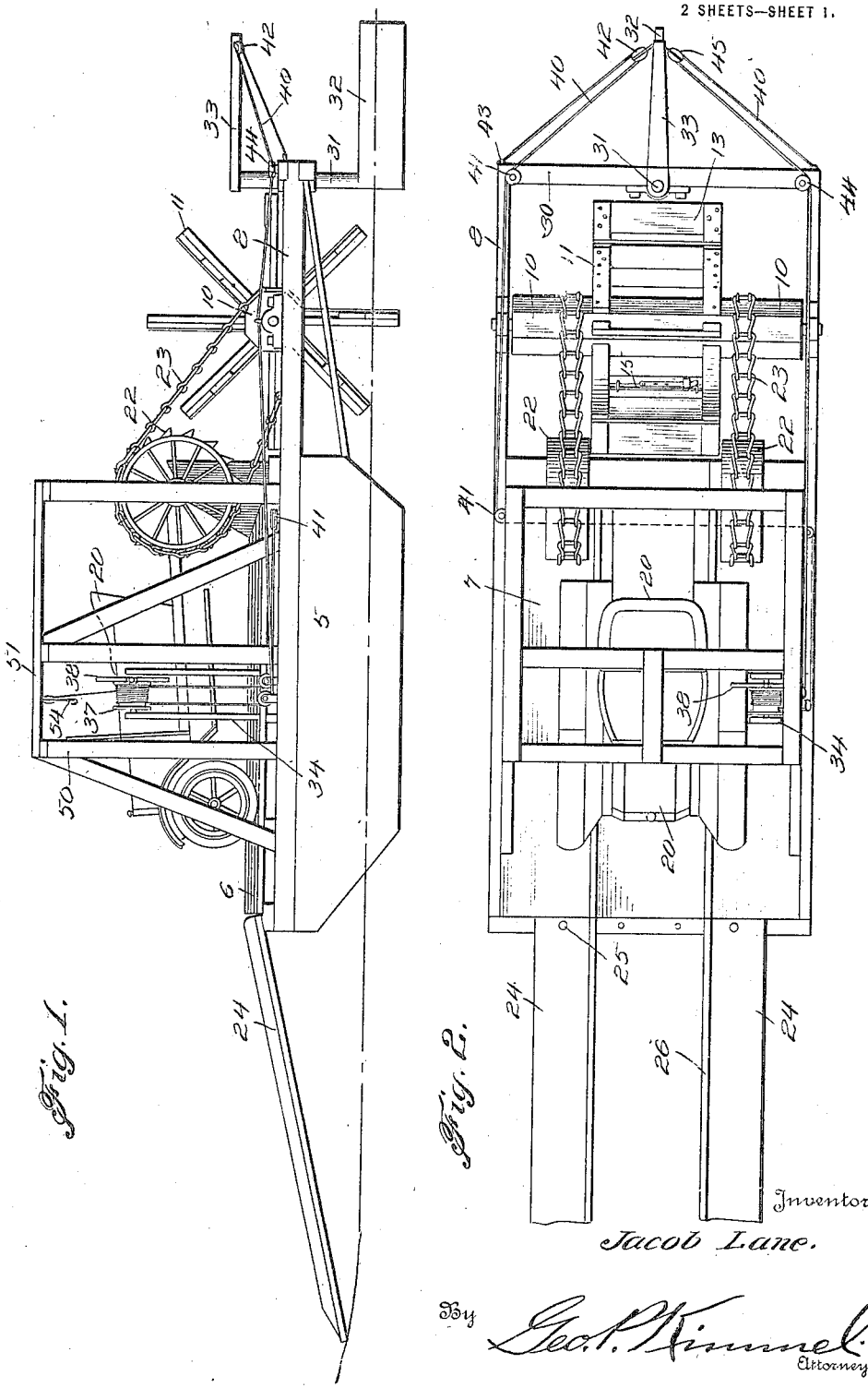

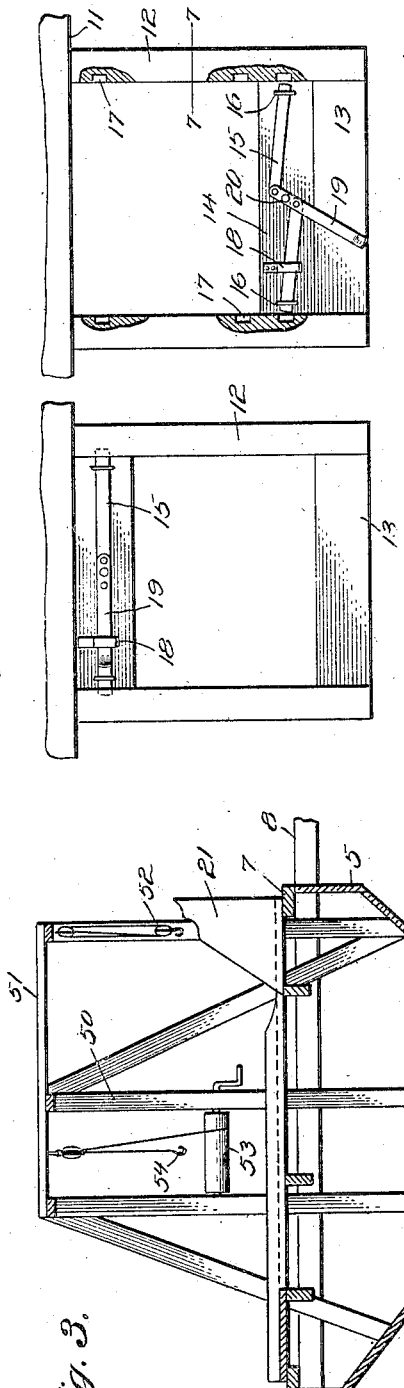

JACOB LANE, OF ANCHORAGE, TERRITORY OF ALASKA.

AUTOMOBILE-PROPELLED BOAT.

1,377,892.  Specification of Letters Patent.  Patented May 10, 1921.

Application filed June 30, 1920. Serial No. 393,037.

*To all whom it may concern:*

Be it known that I, JACOB LANE, a citizen of the United States, residing at Anchorage, Territory of Alaska, have invented certain new and useful Improvements in Automobile-Propelled Boats, of which the following is a specification.

This invention relates to means designed for the utilization of the motive power of motor vehicles of conventional types for the propulsion of water crafts.

The principal objects of the invention are, to provide a power transmission device for attachment to a motor vehicle having rear tractor wheels whereby to actuate a paddle wheel of a vessel, to provide means for steering the vessel conveniently from the seat of the motor vehicle, and to provide means whereby a motor vehicle may be readily run onto or off of the vessel when docked.

Furthermore the invention contemplates the provision of a power transmission device which may be applied to a motor vehicle of the tractor type without changing any of the structural features of the vehicle so that the same may be run upon the deck of the vessel to propel the latter to a given destination and upon arriving at that point may be conveniently run upon the ground and utilized in the ordinary manner.

With these and other objects in view, the invention consists in certain novel features of construction as hereinafter shown and described and then specifically pointed out in the claims, and in the drawings illustrative of the preferred embodiment of the invention.

Figure 1 represents a side elevation of the invention.

Fig. 2 represents a top plan view thereof.

Fig. 3 represents a longitudinal sectional view through the vessel, partly broken away and with the motor vehicle removed.

Fig. 4 represents a horizontal sectional view through the superstructure of the vessel, the deck of the latter being shown in elevation.

Figs. 5 and 6 represent fragmentary views of the paddle wheel illustrating the various adjustments of the blades thereof.

Fig. 7 represents a transverse sectional view on the line 7—7 of Fig. 6.

Referring to the drawings in detail, wherein similar reference numerals designate corresponding parts throughout the several views the numeral 5 indicates the body or hull of a conventional type of flat bottom scow having an opening 6 in the deck 7 thereof for convenience in loading and unloading the cargo. The side members of the deck structure are extended rearwardly from the stern of the vessel to provide supporting arms 8 for bearings 9 with which the supporting shaft 10 of the propeller designated generally by the numeral 11 is journaled.

The propeller is of the rotary paddle type and the radial blade is of sectional form and is supported in a pair of arms 12. The outermost section 13 of this blade is relatively narrow and stationary whereas the inner section 14 is capable of adequate adjustment according to the weight of the load carried by the vessel and is mounted for sliding movement between the arms 12. A pair of oppositely movable locking bolts 15 are mounted for longitudinal movement in guides 16 arranged adjacent each inner section 14 and the bolts are adapted for reception in sets of notches 17 formed in the adjacent sides of the opposed arms 12 whereby the adjustable section is capable of a wide range of adjustment radially of the axis of the propeller. The adjacent terminals of the locking bolts are pivotally connected with a lever 19 on opposite sides of the pivotal axis 20 of the latter so that by proper manipulation of the lever 19 the bolts may be projected into or retracted from the notches 17 to lock or release the adjustable section as desired. A preferred type of lock 18 is attached to each adjustable section and coacts with the lever 19 to maintain the latter in alinement with the bolts, as suggested in Fig. 5 and thereby prevent accidental displacement of said bolts.

The motor vehicle 20 for utilization in the propulsion of the vessel is movably mounted upon the deck 7 and the rear axle is supported in elevated position upon upright stands 21 located at the rear of the deck and adequately notched to receive the axle and prevent accidental displacement thereof. The vehicle 20 is preferably of the tractor type on which the rear drive wheels are ordinarily equipped with traction cleats 22 as wheels which are so equipped are better suited for coöperation with the drive chains 23 which are extended thereover. The rear portions of the drive chains are extended over the axle on opposite sides of the propeller 11 so that the rotary movement of the drive wheels of the vehicle incident to the operation of the engine is transmitted to the propeller thereby moving the vessel over the surface of the water.

To provide for the convenient transportation of the vehicle between the land and deck of the vessel tracks 24 are removably secured in position by pins 25 and are provided along their adjacent edges with guide flanges 26 designed to prevent the vehicle from accidental running off of the track. When a landing is to be made the track sections 24 are placed in position shown in Figs. 1 and 2 subsequently fastened by the pins 25 while during use of the vessel the tracks may be conveniently stored upon the deck 7.

The track sections 24 may be readily converted into a gang plank by moving the sections 24 to the position shown in Fig. 4 then subsequently fastening them by the pins 25. When so adjusted, the track sections 24 are disposed in abutting relation with the flanges 26 outermost thereby permitting passage of hand trucks thereover for loading and unloading the vessel.

The rear extremities of the supporting arms 8 are connected by a bridging piece 30 pivotally supporting the post 31 of the rudder 32 by which the course of the vessel may be varied as desired. The upper extremity of the rudder post is connected with a rearwardly extending arm 33.

A supporting stand 34 provided with a base 35 is pivotally mounted at 36 on the deck 7 of the vessel and rotatably supports a drum 37 carrying a steering wheel 38 provided with radiating spokes for convenience of manipulation. As suggested in Fig. 2, the stand 34 is so arranged as to support the steering wheel 38 in such position as to be conveniently accessible by the pilot who may principally occupy the seat of the vehicle. Due to the pivotal mounting 36 of the stand the latter may be readily swung to a position permitting free movement of the vehicle to and from the deck 7. A suitable type of lock 39 is provided to rigidly maintain the stand in adjusted position and insure against accidental displacement thereof during use of the vessel.

The medial portion of a cable 40 is wound about the drum 37 while one end thereof is extended over pulleys 41 arranged on the deck 7 and the bridging piece connecting the arms 8. This terminal of the cable is also extended over a pulley 42 secured to one side of the rudder 32, being finally secured at 43 to the rear extremity of the right hand supporting arm 8. The opposite extremity of the cable is extended over guides 44 and a pulley 45 secured to the opposite side of the rudder and being finally secured to the left side of the vessel. Thus as the winding drum 37 is rotated in one direction and then in the other the opposite extremities of the cable are alternately let out and drawn in exerting a lateral pull upon the arm 33 which incidently produces a corresponding adjustment of the rudder 32.

A frame structure consisting of a series of uprights 50 and horizontal beams 51 is arranged upon the deck 7 and supports a preferred type and block and tackle 52 whereby the rear part of the vehicle may be readily elevated and placed upon the supporting stands 21. A drum 53 is adequately journaled in the uprights 50 and is provided with a cable and hook 54 for convenience in handling the cargo disposed in the hold of the vessel.

What I claim is:

1. In combination, a vessel including means for supporting a motor vehicle, means for utilizing the movement of the drive wheels of the motor vehicle in the propulsion of the vessel, a rudder, a rudder control, and means adjustably supporting the rudder control.

2. In combination, a vessel provided with motor vehicle supporting means, means for utilizing the movement of the drive wheels of a motor vehicle in the propulsion of the vessel, a rudder, controlling means for the rudder, and a stand supporting the controlling means and adjustably supported upon the vessel and movable to a position adjacent the vehicle.

3. In combination, a vessel provided with vehicle supporting means, means for utilizing the movement of the vehicle drive wheels in the propulsion of the vessel, a rudder, a stand pivotally mounted on the vessel and movable to a position adjacent a vehicle supported thereon, means for maintaining the stand in adjusted position, and rudder adjusting means supported in said stand.

4. In combination, a vessel, a propeller therefor, means for supporting the drive axle of a motor vehicle in elevated position, means for elevating a vehicle upon the supporting means, and flexible detachable drive chains operably connected with the propeller and adapted for engagement with the drive wheels of a motor vehicle.

In testimony whereof I affix my signature hereto.

JACOB LANE.